United States Patent Office

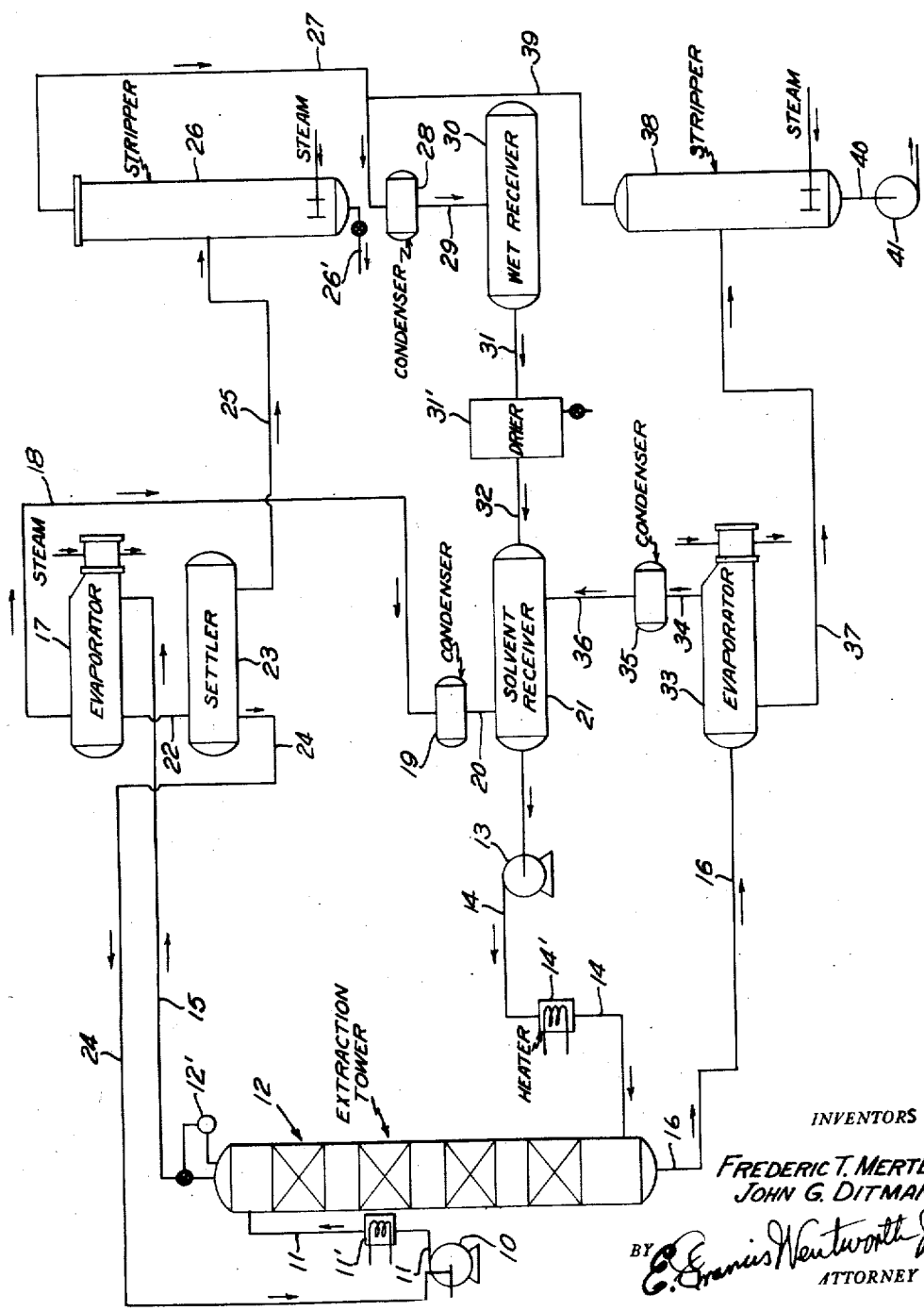

2,809,885
Patented Oct. 15, 1957

2,809,885

SULFUR PURIFICATION PROCESS

John G. Ditman, Newark, and Frederic T. Mertens, Rutherford, N. J., assignors to Foster Wheeler Corporation, New York, N. Y., a corporation of New York Application December 22, 1953, Serial No. 399,780

3 Claims. (Cl. 23—310)

This invention relates to a process for the purification of sulfur, and more particularly to the purification of sulfur through the removal of hydrocarbon impurities therefrom by a solvent extraction process.

In many sulfur producing fields, the sulfur contains a high content of carbonaceous or hydrocarbon impurities which is in solution with the sulfur. This impurity varies from 0.1% by weight to 1.0% by weight and occasionally more. If very low concentrations of impurity exist, conventional purification methods, such as, for example, distillation or activated earth contacting and filtration can be used. When the hydrocarbon impurity approaches 1.0% by weight, however, this method is no longer economical because the amount of activated earth needed becomes excessive, and because of the loss of sulfur which combines with the hydrocarbon impurity removed.

In accordance with the present invention, hydrocarbon impurities are removed from sulfur by a solvent extraction process using as a solvent a cyclic hydrocarbon compound, for example, a cyclo paraffine, such as, cyclo hexane, cyclo pentane or methyl-cyclo hexane, or an aromatic solvent, such as, benzene, xylene, or toluene. The sulfur containing the hydrocarbon impurities is passed into a separation zone, for example, a packed tower, wherein it is brought into contact with the cyclic hydrocarbon compound. In the separation zone, the temperature of the sulfur is maintained at a degree above the melting point, but below the point at which the viscosity of the sulfur rapidly increases while the pressure is maintained at such value that the solvent will not vaporize. The solvent thereby extracts from the sulfur most of the hydrocarbon impurities, both the impurities and the small portion of the sulfur which is in solution with the impurities being dissolved in the solvent. This hydrocarbon-sulfur-solvent mixture which forms a lighter phase in the separation zone is sent to a solvent recovery system wherein the solvent is removed and thereafter returned to the system. The heavier phase formed in the tower, comprising a relatively pure sulfur-solvent mixture, is sent to a solvent recovery system wherein the solvent is separated from the pure sulfur and the solvent thereafter returned to the tower. Thus, in accordance with the present invention, a purified sulfur may be produced containing 0.1% by weight or less, of hydrocarbon impurity.

The invention will be understood from the following description when taken in connection with the accompanying drawing forming a part thereof.

Referring to the drawing, sulfur feed containing hydrocarbon impurities is forced by pump 10 through conduit 11 into the upper portion of extraction tower 12. A cyclic hydrocarbon compound solvent such as, cyclo paraffine or an aromatic solvent, for example, benzene, is forced by pump 13 into the lower portion of the tower 12 through a pipe 14. In tower 12, the sulfur feed and solvent flow countercurrent to and in contact with one another. The sulfur feed and the solvent are contacted at a temperature which is above the melting point of sulfur but below the temperature at which the viscosity of sulfur rapidly increases and at a pressure which is sufficient to avoid vaporization of the solvent. For example, the temperature would be maintained between a lower range of 230° F. to 240° F. and an upper range of 312° F. to 315° F. The desired solvent temperature is obtained by a heater 14' disposed in pipe 14 while the sulfur temperature is obtained by a combination heater-cooler 11' disposed in conduit 11 and connected by means not shown to a supply of steam and cooling water. When the solvent used is an aromatic solvent, for example benzene, sufficient pressure above the pressure corresponding to saturation temperature is maintained in the tower to avoid vaporization of the solvent. Pressure is maintained in the tower by pressure controller means 12' connected thereto and to pipe 15 in communication with the top of the tower. A lighter phase and a heavier phase are formed which lighter phase comprises hydrocarbon impurities from the sulfur and a minor portion of sulfur both of which are dissolved to the point of near saturation in the solvent by said contacting in tower 12 thereby forming a hydrocarbon-sulfur-solvent mixture. The heavier phase comprises a mixture of relatively pure sulfur and a minor proportion of solvent. The lighter phase is passed from the top of the tower through pipe 15 while the heavier phase is passed from the bottom of the tower through pipe 16.

The lighter phase mixture passing through pipe 15 is sent to a high pressure steam unit or evaporator 17 of a solvent recovery system which system comprises high pressure steam unit or evaporator 17 and a settler 23. A portion of the solvent in the lighter phase mixture is vaporized in evaporator 17 and passes through vapor pipe 18 to solvent condenser 19. The solvent condensate from condenser 19 flows through conduit 20 into solvent receiver 21 where it is recirculated by pump 13 into tower 12 through solvent conduit 14. Such lighter phase mixture in unit 17 is then passed from the steam unit 17 through conduit 22 to extract settler 23. Because of the reduction in concentration of the solvent by evaporation, a portion of the dissolved sulfur is precipitated in settler 23 together with a small portion of the hydrocarbon impurity. The precipitated sulfur settles to the bottom and is returned, along with the small amount of combined hydrocarbon impurity, therein through conduit 24 and feed line 11 to tower 12 for further removal of the hydrocarbon impurity therefrom.

The portion of the lighter phase mixture from which said precipitated sulfur is thusly removed and which comprises a solvent-hydrocarbon mixture is passed from extract settler 23 through conduit 25 into stripping tower 26 where solvent is stripped from the mixture by the use of a steam stripping medium. The solvent thusly stripped from the mixture flows out the top of the tower through conduit 27 to condenser 28 where it is condensed. The hydrocarbon impurities remaining are removed from the bottom of the tower through conduit 26'. Solvent condensate passes from condenser 28 through conduit 29 to wet solvent receiver 30 and thence through conduit 31 to drier 31' wherein traces of steam condensate from the steam used as a stripping medium in stripping tower 26 is removed from the solvent. The recovered solvent is then passed from drier 31' through conduit 32 into receiver 21 for recirculation into tower 12 by pump 13 through pipe 14.

The heavier phase sulfur-solvent mixture leaves tower 12 at the bottom thereof through conduit 16 and passes to a recovery system comprising a high pressure steam unit or evaporator 33 and a solvent receiver 21. In evaporator 33 a portion of the solvent in the mixture is vaporized and the vapor passes through vapor pipe 34 to solvent condenser 35 wherein the vapor is condensed.

Solvent condensate from condenser 35 flows through conduit 36 into solvent receiver 21 from which it is recirculated into tower 12 by pump 13 through solvent conduit 14. The unvaporized portion of sulfur-solvent mixture passes from evaporator 33 through conduit 37 into sulfur or raffinate stripper 38 where solvent is stripped from the mixture by the use of steam stripping medium. The stripped solvent passes out the top of the tower through pipe 39 to conduit 27 into condenser 28. Condensed solvent flows through conduit 29 to wet solvent receiver 30 and thence through conduit 31 to drier 31' wherein traces of condensed steam from the stripping tower in admixture with the solvent is removed therefrom. The recovered solvent thereafter passes to receiver 21 whence it is thereafter circulated to tower 12 by pump 13 for use again in the system. Pure product sulfur is pumped out the bottom of the tower 38 through line 40 by pump 41 thereafter to flow to storage receptacles, not shown.

It will be understood that changes may be made in the form of the apparatus herein disclosed and in the steps of the method herein described without departing from the spirit of the invention, which is not to be limited excepting by the scope of the appended claims.

What is claimed is:

1. A continuous process of purifying sulfur containing hydrocarbon impurities which process comprises flowing liquid sulfur containing said impurities into a separation zone, treating said sulfur in the separation zone by flowing the sulfur at a temperature above 230° F.–240° F. but below 312° F.–315° F. and a cyclic hydrocarbon compound solvent in countercurrent contact with one another under such pressure that the solvent will not vaporize, extracting said impurities from the liquid sulfur by said solvent thereby forming a hydrocarbon-sulfur-solvent mixture and a sulfur-solvent mixture, flowing said hydrocarbon-sulfur-solvent mixture to a solvent recovery zone, recovering in said solvent recovery zone solvent from the hydrocarbon-sulfur-solvent mixture, flowing said sulfur-solvent mixture to a solvent recovery zone, recovering solvent in said solvent recovery zone from said sulfur-solvent mixture, and thereafter recycling said recovered solvent to the separation zone.

2. A continuous process of purifying sulfur containing hydrocarbon impurities which process comprises flowing liquid sulfur containing said impurities into a separation zone, treating said sulfur in the separation zone by flowing the sulfur and a benzene solvent at a temperature above 230° F.–240° F. but below 312° F.–315° F. in countercurrent contact with one another under such pressure that the benzene will not vaporize, extracting said impurities from the liquid sulfur by said benzene solvent thereby forming a hydrocarbon-sulfur-benzene-solvent mixture and a sulfur-benzene-solvent mixture, flowing said hydrocarbon-sulfur-benzene-solvent mixture to a solvent recovery zone, recovering in said solvent recovery zone benzene from the hydrocarbon-sulfur-benzene-solvent mixture, flowing said sulfur-benzene-solvent mixture to a solvent recovery zone, recovering benzene in said solvent recovery zone from said sulfur-benzene-solvent mixture, and thereafter recycling said recovered benzene solvent to the separation zone.

3. A continuous process of purifying sulfur containing hydrocarbon impurities which process comprises flowing liquid sulfur containing said impurities into a separation zone, treating said sulfur in the separation zone by flowing the sulfur and a benzene solvent at a temperature above 230° F.–240° F. but below 312° F.–315° F. in countercurrent contact with one another under such pressure that the benzene will not vaporize, extracting said impurities from the liquid sulfur by said benzene solvent thereby forming a lighter phase hydrocarbon-sulfur-solvent mixture and a heavier phase sulfur-solvent mixture, flowing said lighter phase mixture to a solvent recovery zone, evaporating solvent from said lighter phase mixture and thereby obtaining an evaporated solvent and a residue of precipitated sulfur and hydrocarbon, condensing said evaporated solvent, flowing the solvent condensate to a solvent recovery zone, flowing said residue to a settling zone wherein the precipitated sulfur settles, recycling said settled sulfur from the settling zone to said separation zone, flowing said heavier phase mixture to a solvent recovery zone, evaporating solvent from said heavier phase mixture thereby to obtain an evaporated solvent and sulfur, condensing said evaporated solvent, flowing said solvent condensate to a solvent receiving zone, recycling solvent from the recovery zone to said separation zone, and withdrawing sulfur from said solvent recovery zone.

References Cited in the file of this patent

UNITED STATES PATENTS

| 2,040,359 | Clayton et al. | May 12, 1936 |
| 2,234,269 | McDonald | Mar. 11, 1941 |
| 2,316,673 | McDonald | Apr. 13, 1943 |

FOREIGN PATENTS

| 366,052 | Great Britain | July 25, 1930 |

Disclaimer 2,809,885.—*John G. Ditman*, Newark, and *Frederic T. Mertens*, Rutherford, N.J. SULFUR PURIFICATION PROCESS. Patent dated Oct. 15, 1957. Disclaimer filed July 20, 1959, by the assignee *Foster Wheeler Corporation*.

Hereby enters this disclaimer to claims 1 and 2 of said patent.

[*Official Gazette September 8, 1959.*]